United States Patent [19]

Oelbermann et al.

[11] Patent Number: 4,666,596
[45] Date of Patent: May 19, 1987

[54] MEMBRANE PLATE FOR CHAMBER FILTER PRESSES

[75] Inventors: Max Oelbermann, Remscheid; Karl A. Rademacher, Wuppertal, both of Fed. Rep. of Germany

[73] Assignee: Rittershaus & Blecher GmbH, Wuppertal, Fed. Rep. of Germany

[21] Appl. No.: 609,444

[22] Filed: May 11, 1984

[30] Foreign Application Priority Data

May 11, 1983 [DE] Fed. Rep. of Germany ....... 3317235

[51] Int. Cl.⁴ ............................................. B01D 25/12
[52] U.S. Cl. .................................. 210/228; 100/194; 210/231
[58] Field of Search ............... 210/224, 227, 228, 229, 210/230, 231; 100/194, 199, 295

[56] References Cited

U.S. PATENT DOCUMENTS

| 270,807 | 1/1883 | Johnson | 210/227 X |
|---|---|---|---|
| 2,122,259 | 6/1938 | McKenna | 210/231 |
| 2,715,965 | 8/1955 | Carver | 210/231 |
| 3,543,938 | 4/1969 | Busse et al. | 210/231 X |
| 3,888,769 | 6/1975 | Schotten et al. | 210/231 X |
| 3,968,039 | 7/1976 | Inujima et al. | 210/225 |
| 4,235,721 | 11/1980 | Nakamura et al. | 210/227 |

FOREIGN PATENT DOCUMENTS

| 70473 | 1/1983 | European Pat. Off. . | |
|---|---|---|---|
| 1961417 | 6/1971 | Fed. Rep. of Germany . | |
| 2933096 | 3/1981 | Fed. Rep. of Germany | 210/228 |
| 2933034 | 3/1981 | Fed. Rep. of Germany | 210/228 |
| 3128970 | 3/1983 | Fed. Rep. of Germany . | |
| 55-47927 | 3/1980 | Japan . | |
| 481667 | 1/1970 | Switzerland | 210/231 |
| 2008428 | 6/1979 | United Kingdom . | |
| 2069360 | 8/1981 | United Kingdom | 210/231 |

Primary Examiner—Richard V. Fisher
Assistant Examiner—W. Gary Jones
Attorney, Agent, or Firm—Antonelli, Terry & Wands

[57] ABSTRACT

A membrane plate for a chamber filter press over which a filter cloth may be stretched on both sides thereof. The membrane plate includes an exchangeable substantially planar membrane member which is loosely enclosed between a bracket plate and a frame and is adapted to be clamped tightly between the bracket plate and the frame only by the closing pressure of the chamber filter press. The bracket plate and the frame, when the filter press is open, are adapted to be moved apart from one another along slide bearing pieces by a distance of 1 to 3 mm until the movement is limited by a stop. By enabling a relative movement when the filter press is open, the membrane is vented during times of stoppage of the open filter press or during ejection of a filter cake or a washing of the filter cloths so as to enable the membrane to readily readjust.

6 Claims, 5 Drawing Figures

MEMBRANE PLATE FOR CHAMBER FILTER PRESSES

The present invention relates to a membrane plate and, more particularly, to a membrane plate for chamber filter presses over which filter cloth is stretched on both sides, with the membrane plate including an exchangeable substantially planar membrane enclosed between a bracket plate and a frame.

Membrane plates of the aforementioned type are disclosed in, for example, Offenlegungsschrifts Nos. 3,128,970 and 2,933,096, as well as in U.S. Pat. No. 3,968,039 and Japanese Laid Open Application No. 55-47927. In these proposed membrane plates, the frame is rigidly fastened at the bracket plate while the membrane is tightly enclosed. Generally, the bracket plate and the frame are secured together by fasteners such as, for example, screws or the like so as to stabilize the position of the bracket plate and the frame.

Additionally, in the aforementioned Offenlegungsschrift No. 2,933,096, plug-type plastic insert members are employed which hold the frame with a rear head and a front double-cone-shaped foot, with the insert members being clamped into a blind-end bore of the bracket plate.

While each of the above noted proposed membrane plates attempt to ensure that the membrane enclosure remains tight after a long service life, as a practical matter, often after only a short use, leaking occurs in the membrane enclosure and/or the membrane tears away since the membrane, in its enclosed area undergoes a material fatigue after a short period of time.

In, for example, U.S. Pat. No. 270,807, a filter press is proposed which includes frames that are tightly clamped together next to one another with a filter plate being disposed between the frames so that they can be moved laterally over a relatively short distance. Elastic closed cushions are provided between each of the second filter plates, with the cushions being inflated through a pressure supply and thereby, in each case, pushing the two filter plates together while a filter cake is pressed out. However, a disadvantage of this proposed construction resides in the fact that a guiding of the large filter plates is very critical because there is a danger of tilting or jamming and, for this arrangement, this proposed construction is not presently being used in practical applications for large filter presses.

In, for example, U.S. Pat. Nos. 3,888,769 and 4,235,721, so called plate filter presses are proposed which, in contrast to a chamber filter press, only have filter plates in the filter plate package and, consequently, do not have the distance frames which, in the case of chamber filter plates, create larger chamber spaces between adjacent filter plates. In the case of these plate filter presses, it has been proposed to dress the filter plates, along their outer surfaces, with membranes and filter cloths which, when the plate filter press is closed are, in each case, clamped tightly between edges of adjacent filter plates. However, in this situation, the membranes, with the high closing pressure of the filter press, are pressed directly against a filter cloth in which case the structure of the filter cake as well as possible irregularities as may occur due to dirtying of the filter cloth, wrinkling, etc., are pressed into the membrane resulting in a premature wearing of the membrane. Because of this fact and also because of an achievable larger chamber of filter cake spaces, chamber filter presses are often preferred in practice where the membranes are clamped in between smooth surfaces which are not subjected to dirtying or soiling through filter cake residue or similar substances.

The aim underlying the present invention essentially resides in providing a membrane plate which increases the total service life of the membrane plate and which enables an easy exchangeability of the membrane thereof.

In accordance with advantageous features of the present invention, the membrane is loosely enclosed between the bracket plate and the frame and is only clamped tightly between the bracket plate and the frame by a closing pressure of the filter press. The bracket plate and frame, when the chamber filter press is opened, is able to be moved apart until they come into abutment with a stop head. The frame is mounted on several projecting slide bearing means anchored in the bracket plate so as to enable a free movement of the frame after the chamber filter press is opened.

The present invention is based upon the recognition that the membrane must carry out sealing functions only during a filtering, washing, and pressing out of the filter cake, but not during periods of stoppage or during an ejection of the filter cake and/or a washing of filter cloths. During the closing of the filter press, when the filter plates are pressed together in edge areas thereof, in accordance with the present invention, the bracket plate, the membrane, and the frame are also tightly clamped together within each membrane filter plate, in which case, the filter press closing pressure furnishes a sealing pressure for the membrane of, for example, 700 $N/cm^2$. Under this high pressure, the elastic membrane material which may, for example, be rubber or ethylene propylene diene monomer (EPDM) can creep out of the clamping area only laterally toward the inside or the outside.

However, during a filtration, the surface pressure, with an increasing inside filter pressure, is reduced to a sealing pressure of, for example, 500 $N/cm^2$. By virtue of this partial pressure drop, it is possible for the membrane material to already partially flow back. Subsequently, when the filter cake is pressed out, the surface pressure, because the membrane is acted upon, is reduced to a sealing pressure of, for example, 100 $N/cm^2$ which permits a more extensive creeping of the membrane material; however, because of the high tensile forces which are now affecting the edge of the membrane, the material is pulled inward out of the clamping area. After a pressing out of the filter cake is completed, the inside pressure is reduced to zero so that the full filter press closing pressure again furnishes the sealing pressure which first prevents a flow back to the membrane material that is pulled toward the inside. However, when the press is opened again, the frame and the bracket plate are now pulled apart to the extent of their play movement and, consequently, the membrane is again lifted in the clamping area. Therefore, the membrane material can now creep back and the membrane can largely adjust back to its original state. By virtue of the regular repeated releasing of the clamping ranges, it is possible to considerably increase the overall useful life of the membrane plates.

The extremely suprising above noted positive results achieved by the present invention where achieved in a relatively simple manner as compared with the membrane plate disclosed, for example, in the above mentioned Offenlegungsschrift No. 2,933,096. In this connection, in the proposed membrane plate, the clamp fit achieved by the plastic insert members must be selected so as to be so tight that, when the filter press is opened, the frame is not completely torn off the bracket plate together with the plastic insert members. However, a disadvantage of this construction resides in the fact that the tight clamp fit does not permit any free limited mobility between the bracket plate and the frame and, consequently, there is no regeneration of the membrane in the clamping area thereof.

In accordance with further features of the present invention, the slide bearing means may be formed, for example, as round bolts which are provided with an expanded stop head forming a limiting stop with the slide bearing pieces being disposed in an undercut axial stepped bore hole of the frame. Advantageously, a play of movement is provided of between about 1-3 mm.

In accordance with still further features of the present invention, the slide bearing means, formed as bolts, may be inserted in blind holes of the bracket plate, with the bolts, in each case, being threadably secured to the bracket plate by means of a fastener such as, for example, a screw, extending through a bottom of the blind hole.

Alternatively, it is also possible in accordance with the present invention for the slide bearing means to be in the form of cap screws provided with a smooth shouldered T-head, with the cap screws being threadably inserted into threaded blind bore holes of the bracket plate, and with the heads of the cap screws being countersunk into the frame.

Preferably, in accordance with the present invention, the frame and the bracket plate are each provided with axially extending through holes which terminate, in surface of the frame and bracket plate which face away from each other, in expanded diameter portions while forming a shoulder. Advantageously, the slide bearing pieces may be fashioned of an expanding anchor made of, for example, V2A steel, bronze or, preferably, a plastic material, with the slide bearing pieces being inserted through the frame and with a front end of the pieces, fashioned as detachable snap connections, being adapted to reach behind the shoulder in the bracket plate. The expanding anchors may terminate in a T-shaped head which easily forms a running slide bearing for the membrane plate. Additionally, with the expanding anchors being formed of a plastic material, such anchors are extremely low in cost and also have the advantage that, for the purpose of detaching or separating the frame from the bracket plate, the anchors may be pressed out of the through holes relatively easily so as to facilitate an exchange of the membrane in a rapid manner especially since only a few such as, for example, only three slide bearing pieces are required for the loose enclosure of the membrane.

Additionally, in accordance with still further features of the present invention, elastic stepped bushings are disposed in an area of the axial through holes, with the stepped bushings being held or maintained in an undercut stepped bore hole of the frame or the bracket plate and serving as a sealing means from plate to plate.

These and other objects, features, and advantages of the present invention will become more apparent from the following description when taken in connection with the accompanying drawing which shows, for the purposes of illustration only, one embodiment in accordance with the present invention, and wherein.

Figure 1:
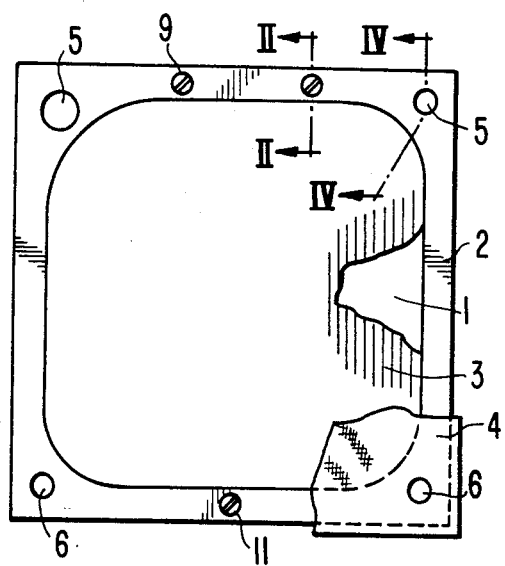
FIG. 1 is a top view of a membrane plate constructed in accordance with the present invention.
Figure 2:
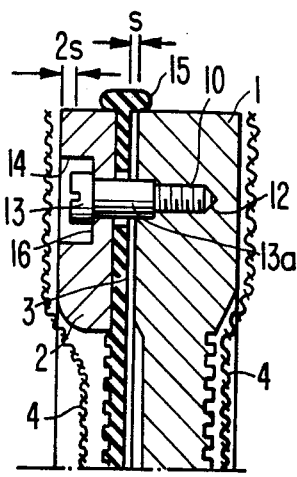
FIG. 2 is a cross sectional view of a bearing of the frame of the membrane plate taken along the line II—II in FIG. 1.
Figure 4:
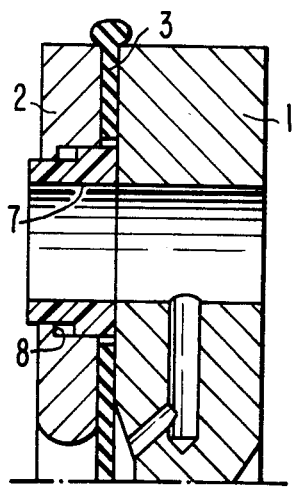
FIG. 4 is a cross sectional view of the membrane plate, in an area of an axial through hole, taken along the line IV—IV in FIG. 1.

Referring now to the drawings wherein like reference numerals are used throughout the various views to designate like parts and, more particularly, to FIGS. 1, 2, and 4, according to these figures, a membrane plate includes a bracket plate 1, a frame 2, and a membrane 3 clamped between the bracket plate 1 and the frame 2, with filter cloths 4 being stretched over both sides of the membrane plate. The bracket plate and membranes 3 are developed as a filter cloth support and a draining zone only at main surfaces thereof which face away from one another.

In a clamping area, the bracket plate 1, the frame 2, and membrane 3 are each provided with upper and lower axially extending ducts through which, in a conventional manner, the pulp supply, the filtrate removal, the washing water supply, and the pressure medium supply are directed for the purpose of being admitted to the membrane 3. The membrane 3, in an area of the axially extending through ducts 5, 6 is provided with enlarged bore holes for accommodating elastic stepped bushings 7 which are fixedly mounted or maintained in an undercut stepped bore hole 8 provided in the frame member 2. The bracket plate 1 and the frame 2 are fastened to one another with a predetermined play s of, for example, 2 mm. For enabling this play, in the embodiment of FIGS. 1 and 2, three slide bearing pieces 9, 10, 11 are provided and fashioned as head screws which are threadably inserted into threaded blind bore holes 12 of the bracket plate 1 and carry the frame 2 on a smooth shouldered portion 13a which terminates in a head portion 13. When the frames are pulled apart, the heads 13 are sunk or accommodated in stepped bore holes 14 of the frame 2 by a distance at least equal to the distance 2s. In this pulled apart condition shown in FIG. 2, the membrane 3 is suspended at its upper thickened edge enlargement 15 and is completely exposed in the clamping area so that, after a previous clamping, the membrane 3 may readily readjust. In the illustrated embodiment, the T-head 13 of the screw interacts with an inside shoulder 16 of the stepped bore hole 14 and acts as a limit stop means which limits the play to the distance s. The membrane, at least at the top thereof, is provided with an edge enlargement 15 which is often wider than the amount of play s so that the membrane 3 also remains suspended at the edge enlargement 15 when the frame 2 is pulled away from the bracket plate 1.

Figure 3:
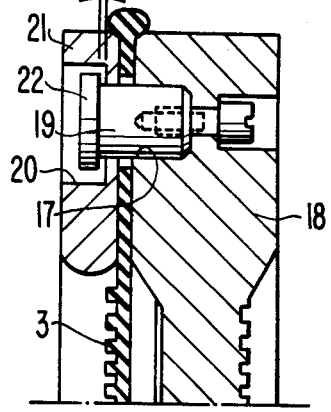
FIG. 3 is a cross sectional view, similar to FIG. 2, of a modified embodiment of a bearing of the frame at a bracket plate of the membrane plate.

As shown in FIG. 3, a slide bearing piece 19 may be fashioned as a bolt inserted into a blind hole 17 in a bracket plate 18, with the bolt having a front protruding end projecting into a stepped bore hole 20 of the frame 21. In this arrangement, the frame 21 rests on a shaft of the bolt so as to be slidably displaceable therealong. The bolt is tightly fastened at the bracket plate 18 through a fastener such as, for example, a screw which penetrates a bottom of the blind bore hole 17. As with the embodiment described hereinabove, a play having a distance s of about 2 mm is provided between a thickened head bearing and an inside shoulder of the stepped bore hole 20.

Figure 5:
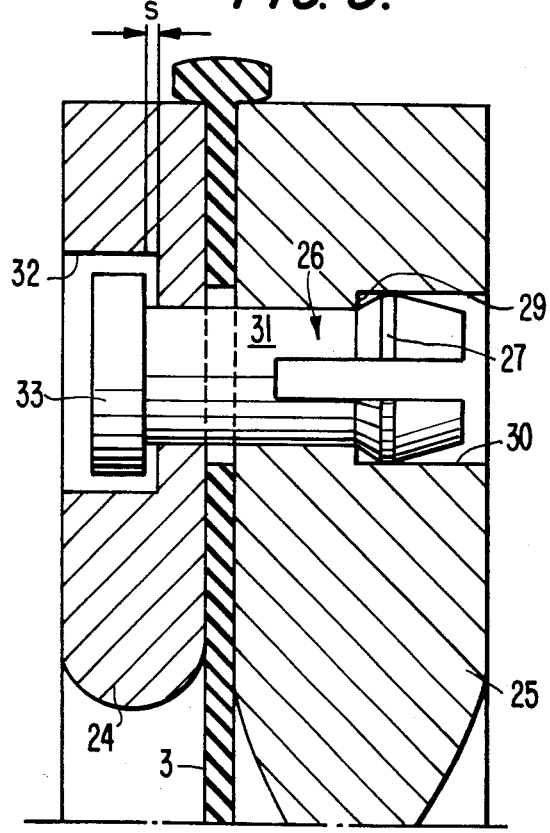
FIG. 5 is a cross sectional view of another embodiment of a bearing of the frame at the bracket plate constructed in accordance with the present invention.

As shown in FIG. 5, a frame 24 and a bracket plate 25 may be fastened to one another through slide bearing pieces 26 which may be formed as expanding anchors fashioned of, for example, a plastic material. Each slide bearing piece 26, formed as an expanding anchor, is provided at a front thereof with a double-cone-shaped end which is constructed so as to form a snap connection 27 adapted to engage behind a ring shoulder 29 of the stepped bore hole 30 provided in the bracket plate 25. A shaft 31 of the expanding anchor is disposed radially, without play, within a more narrow portion of the stepped bore hole 30 and projects with a radial play through a narrow part of the stepped bore hole 32 in the frame 24. The frame 24 is again disposed on a shaft portion 31 of the anchor and is adapted to be moved with a play by a distance s and, when the filter plate package is pulled apart, the frame 24 is adapted to be brought in abutment with a cylindrical stop head 33 provided at the rear end of the shaft portion 31.

As with the above described embodiment, only three slide bearing connection points need be provided between the bracket plate and the frame to ensure a sufficient connection. The bearing connection points in the embodiment of FIGS. 3 and 5 may be arranged in the same manner as shown in FIG. 1, namely, with bearings 9, 10 being arranged at the upper edge on the right and left of a vertical center and a bearing 11 being arranged at a lower edge substantially centrally of the membrane plate.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A membrane plate for chamber filter presses, the membrane plate comprising a frame means, a bracket plate means, a membrane means laminarly enclosed with a circumferential flat edge portion between said frame means and said bracket plate means, bearing means mounted in said bracket plate means for supporting said frame means so as to enable a relatively free movement therebetween and to enable said flat edge portion of the membrane means to be loosely enclosed when the chamber press is opened and to be clamped between the bracket plate means and frame means only by a closing pressure of the filter press, stop means of said bearing means for limiting the movement of the bracket plate means with respect to the frame means thereby defining a limit of a predetermined play therebetween, further means provided along at least a top edge of said membrane means, said further means resting on an outer edge of said frame means and said bracket plate means for supporting the membrane means between the frame means and the bracket plate means when the frame means and the bracket plate means are moved away from each other to the extent of the predetermined play, and wherein said frame means and said bracket plate means are each provided with a plurality of axially extending stepped bore means, said bore means are disposed such that the step thereof is arranged at ends of the bore means facing away from one another, said bearing means including a pluraltiy of expanding anchor means adapted to be inserted through the frame means, each of said anchor means including a head portion at one end thereof forming said stop means and a snap connection means at an opposite end thereof adapted to engage behind a shoulder of the stepped axial bore means of said bracket plate means so as to enable a detachment of the frame means from the bracket plate means.

2. A membrane plate according to claim 1, wherein said anchor means is made of one of a plastic material, V2A steel, or a bronze material.

3. A membrane plate according to claim 2, wherein two anchor means are disposed at the top of the frame means to a right and left of a vertical center line thereof and another anchor means is arranged at a lower end of the frame means substantially centrally thereof.

4. A membrane plate according to claim 1, further comprising a plurality of axially extending duct means provided in the bracket plate means, frame means, and membrane means for respectively supplying a material, removing a filtrate, supplying a wash solution, and supplying a pressure medium, a stepped elastic sealing bush means is disposed in an area of each of said axially extending duct means, and wherein an undercut stepped bore means is provided in at least one of the frame means and the bracket plate means for accommodating the stepped elastic sealing means.

5. A membrane plate according to claim 1, wherein the predetermined play is in the range of 1 to 3 mm.

6. A membrane plate according to claim 1, further comprising a filter cloth means adapted to be stretched along both sides of the membrane plate.

* * * * *